(12) United States Patent
Sung et al.

(10) Patent No.: US 11,245,546 B2
(45) Date of Patent: Feb. 8, 2022

(54) METHODS AND SYSTEMS FOR TRANSMITTING AND RECEIVING DATA PACKETS THROUGH A BONDED CONNECTION

(71) Applicant: Pismo Labs Technology Limited, Kowloon (HK)

(72) Inventors: Patrick Ho Wai Sung, Kowloon (HK); Kam Chiu Ng, New Territories (HK); Wan Chun Leung, New Territories (HK)

(73) Assignee: Pismo Labs Technology Limited, Kowloon (HK)

( * ) Notice: Subject to any disclaimer, the term of this patent is extended or adjusted under 35 U.S.C. 154(b) by 2 days.

(21) Appl. No.: 16/322,073

(22) PCT Filed: Nov. 27, 2017

(86) PCT No.: PCT/IB2017/057399
§ 371 (c)(1),
(2) Date: Jan. 30, 2019

(87) PCT Pub. No.: WO2019/102257
PCT Pub. Date: May 31, 2019

(65) Prior Publication Data
US 2020/0052926 A1 Feb. 13, 2020

(51) Int. Cl.
*H04L 12/863* (2013.01)
*H04L 12/28* (2006.01)
(Continued)

(52) U.S. Cl.
CPC ...... *H04L 12/2865* (2013.01); *H04L 12/4633* (2013.01); *H04L 43/087* (2013.01); *H04L 67/2852* (2013.01)

(58) Field of Classification Search
CPC ............ H04L 12/2865; H04L 12/4633; H04L 43/087; H04L 67/2852; H04L 12/2863
See application file for complete search history.

(56) References Cited

U.S. PATENT DOCUMENTS

| 6,680,933 B1* | 1/2004 | Cheesman | H04L 12/6402 370/352 |
| 7,554,929 B1* | 6/2009 | Omar | H04L 43/10 370/252 |

(Continued)

FOREIGN PATENT DOCUMENTS

| CN | 101697631 A | 4/2010 |
| CN | 106603407 A | 4/2017 |

OTHER PUBLICATIONS

International Search Report of International Application No. PCT/IB2017/057399, dated Aug. 29, 2018.
(Continued)

*Primary Examiner* — Edan Orgad
*Assistant Examiner* — Malick A Sohrab
(74) *Attorney, Agent, or Firm* — FisherBroyles, LLP; Victoria L. Boyd; Allen Kim

(57) ABSTRACT

The present invention relates to methods and systems for transmitting and receiving data packets between a first network node and a second network node through a bonded connection. At the first network node, a data packet, a session identification of the data packet and a time value of the data packet are encapsulated in an encapsulating packet. The first network node sends the encapsulating packet from the first network node to the second network node through the bonded connection. The second network node then stores the encapsulating packet after receiving it and determines an expiration time of the encapsulating packet. When the expiration time of the encapsulating packet expired, the
(Continued)

second network node dequeues the encapsulating packet and forwards the data packet according to destination of the data packet.

18 Claims, 11 Drawing Sheets

(51) Int. Cl.
*H04L 12/46* (2006.01)
*H04L 12/26* (2006.01)
*H04L 29/08* (2006.01)

(56) References Cited

U.S. PATENT DOCUMENTS

| | | | |
|---|---|---|---|
| 9,729,350 B1* | 8/2017 | Cohn | H04L 47/34 |
| 2010/0250747 A1 | 9/2010 | Karaoguz et al. | |
| 2010/0260180 A1* | 10/2010 | Wu | H04L 1/1819 |
| | | | 370/390 |
| 2011/0013519 A1* | 1/2011 | Chang | H04L 67/1027 |
| | | | 370/241 |
| 2011/0205912 A1* | 8/2011 | Leong | H04L 43/106 |
| | | | 370/252 |
| 2014/0226663 A1* | 8/2014 | Chan | H04L 47/624 |
| | | | 370/392 |
| 2015/0381509 A1 | 12/2015 | Sreeramoju | |
| 2016/0261504 A1* | 9/2016 | Sung | H04W 24/08 |
| 2016/0308769 A1* | 10/2016 | VerSteeg | H04L 43/0894 |

OTHER PUBLICATIONS

Written Opinion of the International Searching Authority of International Application No. PCT/IB2017/057399, dated Aug. 29, 2018.

* cited by examiner

| t=0s | |
|---|---|
| Tunnel | Latency |
| A | 10 ms |
| B | 12 ms |
| C | 20 ms |
| D | 5 ms |
| E | 21 ms |
| F | 100 ms |

| t=10s | |
|---|---|
| Tunnel | Latency |
| A | 80 ms |
| B | 5 ms |
| C | 10 ms |
| D | 7 ms |
| E | 19 ms |
| F | 20 ms |

| Type | Data 1 | Data 2 |
|---|---|---|
| BWOPT_VERSION (0x01) | Version of this packet. Currently it is 1. | Nil |
| BWOPT_MAX_WAN (0x02) | Maximum number of WAN connections on the sender | Nil |
| BWOPT_WAN_MAXBW (0x03) | Number of 32 bit words in the Data field | WAN connection's maximum downlink bandwidth in kbyte per sec. 32-bit word for each WAN. |
| BWOPT_DROP_RATE (0x04) | Number of 32-bit words in the Data field. This must be 2. | First 32-bit word is the number of packet dropped. Second 32-bit word is the total packet received. |

*Fig. 4B (Prior Art)*

METHODS AND SYSTEMS FOR TRANSMITTING AND RECEIVING DATA PACKETS THROUGH A BONDED CONNECTION

TECHNICAL FIELD

The present application is related to data communication, and more specifically to optimizing throughput of data transfer over multiple logical paths.

BACKGROUND ART

A multi Wide Area Network (WAN) Site-to-Site router is a router that supports bonding multiple interconnections, e.g., WAN connections for accessing one or more remote networks. Data belonging to one session may be sent from the sending router to the receiving router through one or a plurality of interconnections of the multiple interconnections. In the implementation that only one interconnection, e.g., one WAN connection, is used to route the data. In this configuration, a single TCP file transfer session can only utilize the bandwidth of one WAN connection on each end. For example, in a session based site-to-site virtual private network (VPN) connection VPN traffic is routed to multiple WAN connections between two sites (e.g., sites A and B). In one implementation, M×N tunnels are initially formed between the WAN connections where M and N are the number of WAN network connections of site A and site B, respectively. Data belonging to one session is then routed over the different tunnels. When packets holding the data are being transmitted over these tunnels, packets may arrive at the receiving sites with different delays and result in incorrect order and jitter.

For example, suppose the M×N tunnels utilize multiple connections, each of which have different throughput bandwidth capabilities and different latencies. Current jitter reduction techniques are mainly based on reordering packets, which hold data of the session, and reducing latencies of the multiple connections.

DISCLOSURE OF INVENTION

Summary of Invention

The present invention discloses methods and systems for transmitting and receiving data packets between a first network node and a second network node through a bonded connection. In one of the embodiments, at the first network node, a data packet, a session identification of the data packet and a time value of the data packet are encapsulated in an encapsulating packet. The first network node sends the encapsulating packet from the first network node to the second network node through the bonded connection. The second network node then stores the encapsulating packet after receiving it and determines an expiration time of the encapsulating packet. When the expiration time of the encapsulating packet expired, the second network node dequeues the encapsulating packet and forwards the data packet according to destination of the data packet.

In another embodiment, the expiration time of the encapsulating packet is determined based on the time value. The expiration time can be further determined based on expiration time of other encapsulating packet received by the second network node earlier, this early received encapsulating packet and the encapsulating packet has the same session identification.

In another embodiment, the second network node adjusts the expiration time of the at least one encapsulating packet received by the second network node earlier.

In another embodiment, the time value is determined based on the time the data packets arrived at the first network node. Alternatively, the time value could also be the time the data packets sent by or upon being sent by the first network node. In some of the embodiments, the time value is recorded in microsecond precision or nanosecond precision.

In another embodiment, at least two of the plurality of connections have different latencies.

In another embodiment, the first network node further encapsulates a global sequence number in the encapsulating packet. The first network node could also encapsulate a session sequence number in the encapsulating packet.

In one embodiment, a network node is provided for reducing jitter during packet processing, the network node includes a network interface, a processing unit and a non-transitory computer readable storage medium comprising program instructions. The processing unit of the network node is capable of executing the program instructions to perform the operation of: determining a buffer period for the transmitted packet; receiving a transmitted packet from a sending network node; identifying the session of the transmitted packet; determining a queue according to the session; determining an expiration time for the transmitted packet. When the queue is not empty, the expiration time is determined based on a difference of time value between corresponding time value of one or more currently stored transmitted packets and corresponding time value of the transmitted packet. When the queue is empty, the expiration time is determined based on the buffer period. The transmitted packet is stored in the queue according to the expiration time.

According to one of the embodiments, when the expiration time is or upon being expired, the transmitted packet is dequeued from the queue and is then decapsulated to retrieve the data packet. The data packet is then forwarded to a destination network node according to the destination address of the data packet.

According to one of the embodiments, the buffer period is configurable per bonded connection, per session or per session per bonded connection.

According to one of the embodiments, identifying of the session is performed according to a session identification in the transmitted packet.

According to one of the embodiments, the transmitted packet is transmitted by a sending network node to the receiving network node through one of a plurality of connections established between the sending network node and the receiving network node.

According to one of the embodiments, wherein the time value is recorded in microsecond precision or nanosecond precision. In another embodiment, the corresponding time value of the transmitted packet is determined based on arrival time of data packet at the sending network node. Alternatively, transmission time of data packet at the sending network node is used to determine the time value.

According to one of the embodiments, when none of corresponding session sequence numbers of priorly arrived transmitted packets is one, no data packet will be forwarded to destination node.

According to one of the embodiments, when session sequence number of the transmitted packet is the smallest among the currently stored packets in the first queue, expiration time of all the currently stored transmitted packets is increased.

BRIEF DESCRIPTION OF DRAWINGS

For a more complete understanding of the present invention, reference is now made to the following descriptions taken in conjunction with the accompanying drawings, in which:

FIG. 4B, a prior art, is a chart that illustrates possible values for the fields of the feedback packet of FIG. 4A;

DETAILED DESCRIPTION

Figures 1, 2:
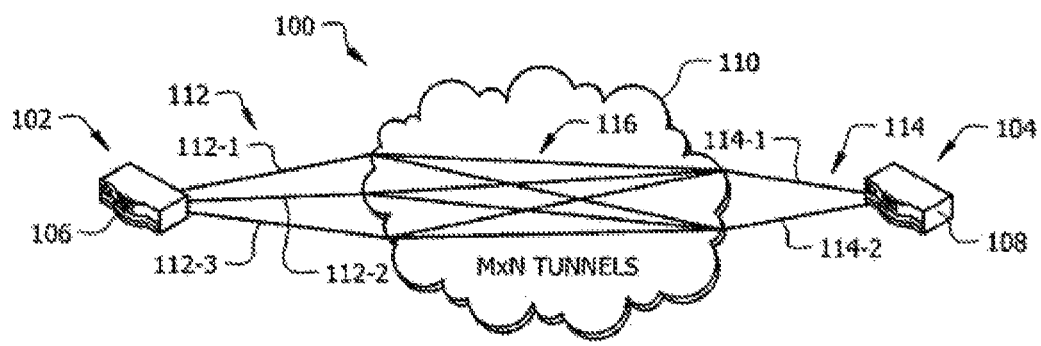
FIG. 1, a prior art, illustrates an overall system for optimizing throughput of multiple variable bandwidth connections in accordance with an embodiment of the present invention.
FIG. 2, is a table illustrating the change of latency of different tunnels through a period of time.

FIG. 1 illustrates system 100 adapted according to embodiments configured to optimize the throughput of bonded multiple variable bandwidth connections by adjusting a tunnel bandwidth weighting schema during a data transfer session. System 100 includes multiple sites 102 and 104, which each comprise at least one communications router 106 and 108. Communication routers 106 and 108 may be embodied as multi WAN routers which support aggregating the bandwidth of multiple Internet connections. Communications routers 106 and 108 are connected over network 110. Network 110 may comprise a local area network (LAN), metropolitan area network (MAN), wide area network (WAN), wireless network, the public switched telephone network (PSTN), the Internet, an intranet, an extranet, etc. FIG. 1 illustrates system 100 adapted according to embodiments configured to optimize the throughput of bonded multiple variable bandwidth connections by adjusting a tunnel bandwidth weighting schema during a data transfer session. System 100 includes multiple sites 102 and 104, which each comprise at least one communications router 106 and 108. Communication routers 106 and 108 may be embodied as multi WAN routers which support aggregating the bandwidth of multiple Internet connections. Communications routers 106 and 108 are connected over network 110. Network 110 may comprise a local area network (LAN), metropolitan area network (MAN), wide area network (WAN), wireless network, the public switched telephone network (PSTN), the Internet, an intranet, an extranet, etc.

Site 102 and router 106 may comprise M connections 112, and site 104 and router 108 may comprise N connections 114. Connections 112 and 114 are data connections for communicating information within network 110 between sites 102 and 104. In the illustrated embodiment, M is equal to 3 and N is equal to 2; however, these values may vary according to desired routers and configurations. Connections 112 and 114 may have similar or differing bandwidth capabilities. Further, connections 112 and 114 may comprise different types of WAN connections, such as a WiFi, cable, DSL, T1, 3G, 4G, satellite connections, and the like. It is also noted that site 102 and site 104 may be thought of as both a sender or receiver, and discussions regarding the functionality of either site may be implemented on the other site. In other words, system 100 may be implemented as a symmetrical network. There is no limitation that M and N are as the same as the number of physical network interfaces of routers 106 and 108 respectively. For example, router 106 has five physical network interfaces for connecting to different WANs and M may be one, ten, one hundred or one thousand. The M×N tunnels may be aggregated to form a bonded tunnel, a bonded VPN or a bonded connection. Tunnels and connections are used interchangeably in the present invention to describe logical connections between two network interfaces, which may be physical or virtual network interfaces.

FIG. 2 illustrates the change of latency of different tunnels, which are established between a first network node and a second network node, through a period of time. As shown in the table, there are six tunnels, Tunnel A to Tunnel F, aggregated to form a bonded connection. Encapsulating packets encapsulate data packets, which are received by one network node and destined to the other network node or destinations reachable through the other network node. At t=0 s, among Tunnels A-F, Tunnel D has the lowest latency (5 ms) while Tunnel F has the highest latency (100 ms), and the first network node sent a plurality of encapsulating packets to the second network node. It is expected that encapsulating packets sent through Tunnel D will arrive at the second network node the earliest while encapsulating packets sent through Tunnel F will arrive last. However, there are myriad factors affecting the latency of each tunnel, resulting an ever-changing latency of a tunnel. At t=10 s, among Tunnels A-F, Tunnel A has the highest latency (80 ms) while Tunnel B has the lowest latency (5 ms). Accordingly, when a plurality of data packets of a session are sent through the bonded connection in sequence, it is likely that the order at the receiving end is different from that at the sending end due to the varying latency of different tunnels. This causes undesirable jitter among data packets at the receiving end. One of the objectives of present invention is to reduce this undesirable jitter.

Figure 3:
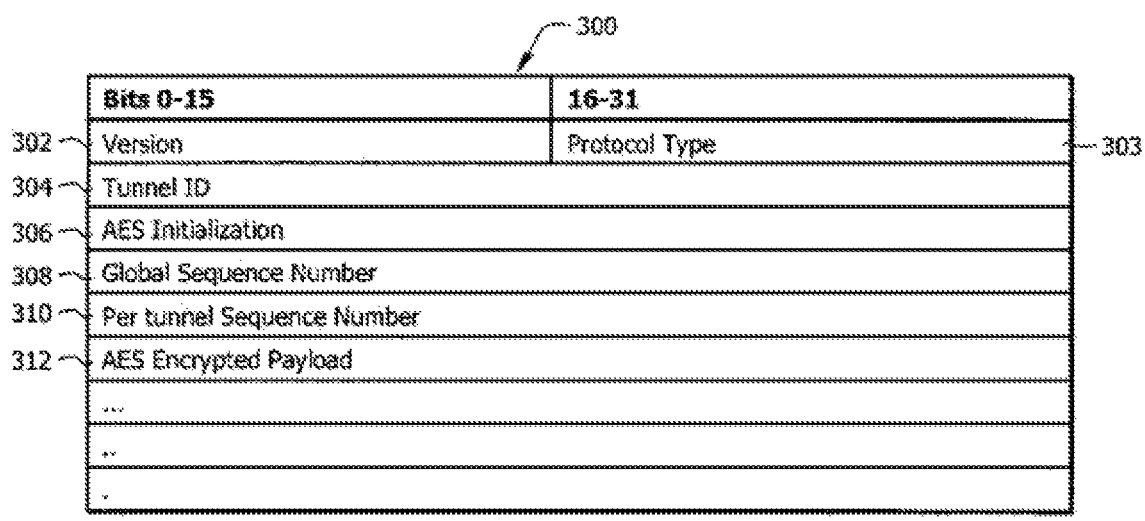
FIG. 3, a prior art, is an example embodiment illustrating the type of information which may be encapsulated in a transmitted IP packet in accordance with an embodiment of the present invention.

To monitor the bandwidth of the various tunnels 116, some embodiments of the present invention encapsulate each transmitted IP packet with various information. Transmitted IP packet may be called as encapsulating packet in the present invention as an IP packet is encapsulated in the transmitted packet. FIG. 3, a prior art, illustrates an example embodiment showing the type of information 300 which may be encapsulated in a transmitted IP packet. Version field 302 may contain information about the protocol version being utilized and protocol type field 303 may contain the protocol type of the payload packet. Tunnel ID field 304 may contain an identifier to identify the current tunnel of the IP packet. Advanced Encryption Standard (AES) initialization vector field 306 may be a 32-bit field and may contain an initialization vector for AES encryption. Global sequence number field 308 may contain a sequence number which is utilized to re-sequence each of the packets for various sessions into the proper order when they have emerged from their respective tunnels. Per tunnel sequence number field 310 may represent a sequence number that is assigned to each packet routed to a particular tunnel.

The per tunnel sequence number discussed is able to be used for packet drop monitoring and re-ordering packet, not cannot be used for reducing jitter for data belong to a session.

Figure 4A:
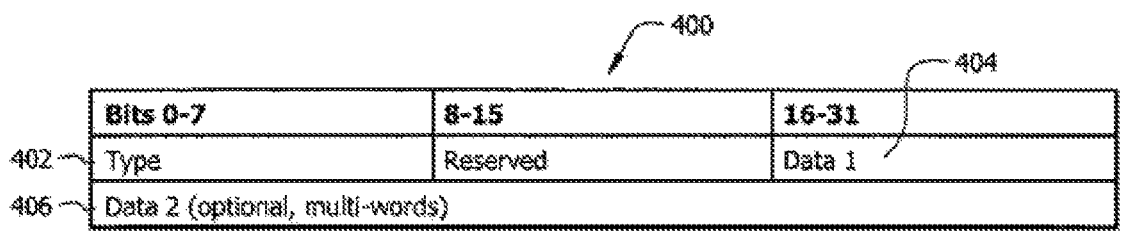
FIG. 4A, a prior art, is an example embodiment illustrating the type of information which may be encapsulated in a feedback packet in accordance with an embodiment of the present invention.

FIG. 4A, also a prior-art, illustrates an example embodiment of the type of information 400 which may be encapsulated in a feedback packet which is sent to the transmitting router in order to report packet drop rates or other bandwidth related data received at the receiving end router. Type field 402 may include data regarding the type of data that will be included in data 1 field 404 and data 2 field 406. Data 1 field 404 and data 2 field 406 may contain any information which may be used to assist the router in determining tunnel information with regard to the number of tunnels, bandwidth of tunnels, number of dropped packets in a tunnel, and the like. An example of possible values of the type field 402 in the data fields 404 and 406 is shown in the chart of FIG. 4B, a prior-art.

As disclosed in prior art, the information which is encapsulated in transmitted IP packets, such as shown in FIGS. 3-4 may also be used for packet buffering and re-sequencing. Because each tunnel's latency can be different, when two consecutive packets of the same TCP session are sent to a VPN peer over a bonded VPN tunnel, they may not arrive in sequence because they are routed via two different tunnels. If the TCP session receives the out-of-sequence packets from the VPN, the TCP session will slow down due to TCP retransmissions. Accordingly, the receiving end should buffer the packets that come too early until either the slower packets arrive or an expiration time has passed. With such buffering, late packets that come prior to an expiration time will be forwarded to the destination device in sequence. This buffering assists in the optimization of end-to-end throughput.

It is noted that embodiments described herein are, at times, discussed in the context of a VPN connection. These discussions are presented in order to show an example embodiment of a bonded connection. The inventive concepts described in claimed herein are not limited to such connections. In fact, any connection where sufficient data may be obtained and exchanged in order to dynamically monitor the bandwidth of a plurality of communication paths which are being used in a data transfer session may be implemented with the embodiments of the present invention.

Embodiments, or portions thereof, may be embodied in program or code segments operable upon a processor-based system (e.g., computer/processing system or computing platform) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any binary digital electronic signal that can propagate over a transmission medium such as electronic network channels, optical fibers, air, electromagnetic media, radio frequency (RP) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

Figure 6:
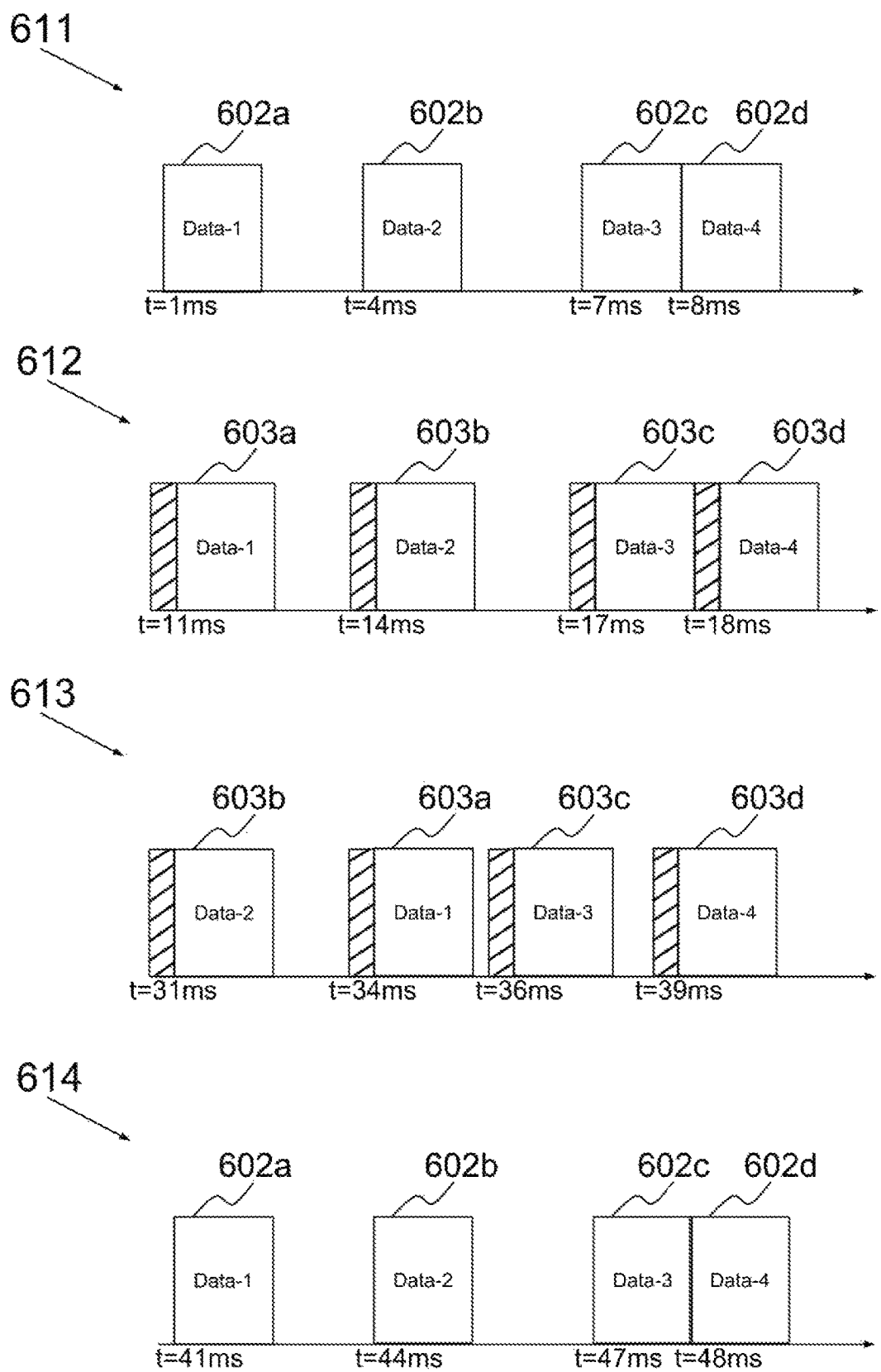
FIG. 6 illustrates time sequences of data packets and embedded IP packets in accordance with an embodiment of the present invention.

FIG. 6 illustrates time sequences of data packets and transmitted IP packets received and transmitted by communications router 106 and 108 according to embodiments of the present invention.

In one example, for illustration purpose, in time sequence 611, communications router 106 received data packets 602a-602d at time t=1 ms, t=4 ms, t=7 ms and t=8 ms respectively from a sending device. Data packets 602a-602d, for illustration purpose, belong to the same session and are destined to a destination device reachable through communications router 108. For readability purpose, contents of data packets 602a-602d are labelled with "Data-1", "Data-2", "Data-3" and "Data-4" respectively. As communications router 106 transmits transmitted IP packets to communications router 108, communications router 106 is the sending router while communications router 108 is the receiving router.

In time sequence 612, transmitted IP packets 603a-603d are transmitted by communications router 106 to communications router 108 through at least one connection. Transmitted IP packets 603a-603d encapsulate data packets 602a-602d respectively and are transmitted at time t=11 ms, t=14 ms, t=17 ms and t=18 ms respectively. Shaded areas of transmitted IP packets 603a-603d illustrate information which may be created by communications router 106 and may be encapsulated in transmitted IP packets 603a-603d. The details of the information is illustrated in FIG. 7.

There is no limitation that all transmitted IP packets must be sent through the same WAN interface or the same tunnel. There is also no limitation that all data packets must be distributed in any particular order or weights among WAN interfaces or tunnels. For example, transmitted IP packets 603a, 603b, 603c and 603d may be transmitted through a first tunnel, a second tunnel, the first tunnel and a third tunnel respectively.

Figure 7:
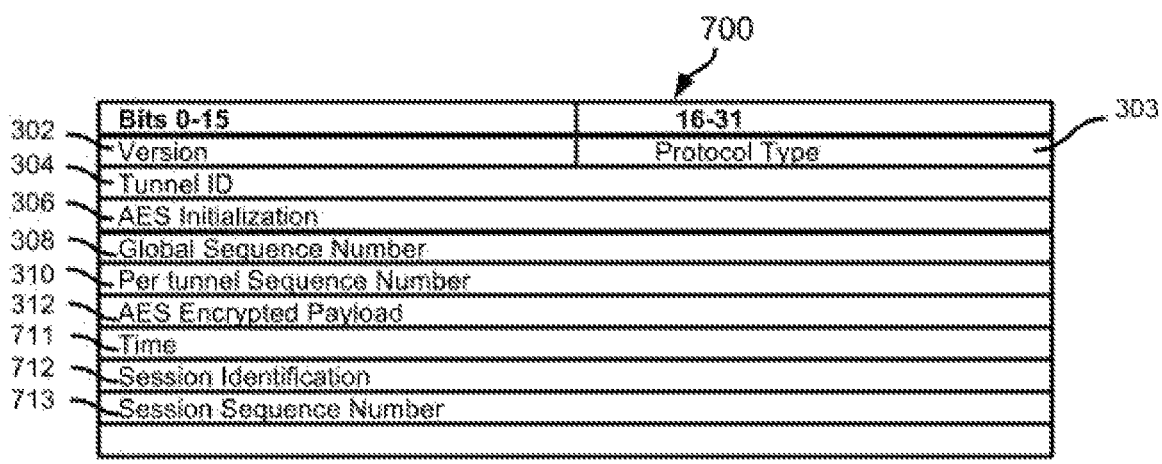
FIG. 7 illustrates the type of information which may be encapsulated in a transmitted IP packet in accordance with an embodiment of the present invention.

FIG. 7 illustrates an example embodiment showing the type of information 700 which may be encapsulated in a transmitted IP packet. Comparing to FIG. 3, fields 711-713 are added. Field 711 is to record the arrival time of a data packet, such as one of data packets 602, at the sending router. The arrival time may be used by receiving router, such as communications router 108, to determine when to forward data packets to destination device. In one variant, field 711 is to record the transmission time of a transmitted IP packet. Before the transmitted IP packet is transmitted by the sending router, field 711 is updated with a time. Therefore, the receiving router may rely on field 711 to forward consecutive data packets with corresponding time difference between the consecutive data packets. It is preferred to have the time recorded by the sending router at least in microsecond precision for network that is not faster than 100 Gbps. If the recorded time is not precise enough, there will be many transmitted IP packets having the same time value in field 711. Receiving router may then not be able to precisely forward consecutive data packets with precise time difference. For network that is faster than 100 Gbps, the time record may be in nanosecond precision.

The time value may be based on an internal clock of the sending router. However, there is no limitation that the time value in field 711 must be a correct clock time. There is also no limitation on the size of field 711. The larger the size field 711 is, the less frequent the time value needs to be reset or start over.

Session identification field 712 is used for holding a value for a session identification, which is used to identify a session. There are myriad ways to identify a session. For example, a session may be identified by deep packet inspection (DPI) or by a combination of source address, source port number, destination address and destination port number. For example, the value for a session identification may be a hash value based on the combination of source address, source port number, destination address and destination port number. In another example, the value for a session identification may be created based on the arrival time of the first data packet of a session. Subsequent transmitted IP packets encapsulating data packets of the session will use the same value for the session identification.

Session sequence number field 713 is for holding a value for a session sequence number. The session sequence number is to allow data packets to be re-ordered at communications router 108, which is the receiving router. For example, consecutive data packets belonging to the same session may have consecutive session sequence number.

In one variant, global sequence number field 308 may be omitted when session identification field 712 and session sequence number 713 are used, as session sequence number may be used for ordering data packets belonging to the same session and/or transmitted IP packets belonging to the same session.

There is no limitation that ordering of fields 302-312 and 711-713 must be in the order illustrated in FIG. 7. There is also no limitation that length of a field must be the same as the number of bits illustrated in FIG. 7.

It is appreciated that if the sending router could record correctly the arrival time or transmission time of each data packets, the receiving router may then be able to determine the correct sequence of the data packets. In one variant, when field 711 is used for recording arrival or transmission time, session sequence number field 713 may be omitted as receiving router may rely on the arrival time or transmission time to determine the sequence of forwarding data packets to the destination device. In one variant, global sequence number field 308 and per tunnel sequence number field 310 may be omitted when field 711 is used for recording arrival or transmission time. In one variant, global sequence number field 308 and per tunnel sequence number field 310 may be omitted when session sequence number field 713 and session identification field 712 are used to determine the correct sequence of transmitted IP packets.

Referring back to time sequence 612, the session sequence numbers encapsulated in information of transmitted IP packets 603a-603d are one, two, three and four respectively in order to indicate that transmitted IP packet 603a is encapsulating the first data packet of the session; transmitted IP packet 603b is encapsulating the second data packet of the session; and so forth.

It is preferred that the time differences between consecutive data packets 602 received and the time differences between consecutive transmitted IP packets 603 transmitted are the same. For example, the time difference between data packets 602a and 602b (t=1 ms and t=4 ms) is preferred to be about the time difference between transmitted IP packets 603a and 603b (t=11 ms and t=14 ms). This may reduce jitter when transmitted IP packets arrived at communications router 108. In another example, data packets 602d is received right after data packets 602c. In order to reduce jitter, transmitted IP packet 603d is preferred to be transmitted right after data packet 603c. Information encapsulated in transmitted IP packets 603a-603d may include arrival time of data packets 602a-602d respectively. Alternatively, the information may include transmission time of transmitted IP packets 603a-603d respectively.

There is no limitation that transmitted IP packets 603 must be transmitted in the same sequence as data packets 602 are received or must be transmitted in the same connection. For example, transmitted IP packets 603a and 603c are transmitted through a first connection, such as connections 112-1, while transmitted IP packets 603b and 603d are transmitted through a second connection, such as connections 112-3.

In time sequence 613, for illustration purpose, transmitted IP packets 603a-603d are received by communications router 108 at time t=31 ms, t=34 ms, t=36 ms and t=39 ms respectively. Transmitted IP packets are not received in the correct sequence. The time differences between consecutive transmitted IP packets 603a-603d are also changed and result in jitters.

In order to forward data packets 602a-602d in the same sequence and reduce jitter, transmitted IP packets 603a-603d are first buffered in one or more queues when they arrived at communications router 108. Data packets 602a-602d are then retrieved by decapsulating transmitted IP packets 603a-603d respectively. Finally, data packets 602a-602d are forwarded to destination device in the same sequence and with substantially the same time difference from respective prior data packets in order to reduce jitter. The time difference may be determined using respective time value stored in field 711 of the transmitted IP packets.

There is no limitation that transmitted IP packets of different sessions must be stored in different queues. The number of queues can be less than the number of session, therefore, transmitted IP packets of different sessions could be stored in the same queue. The receiving router could identify the session of each transmitted IP packet according to the session identification in field 712. When determining the expiration time of each transmitted IP packets, even though there may be transmitted IP packets of different sessions stored in the same queue, the calculation is based on one or more transmitted IP packets with same session identification.

Figure 8:
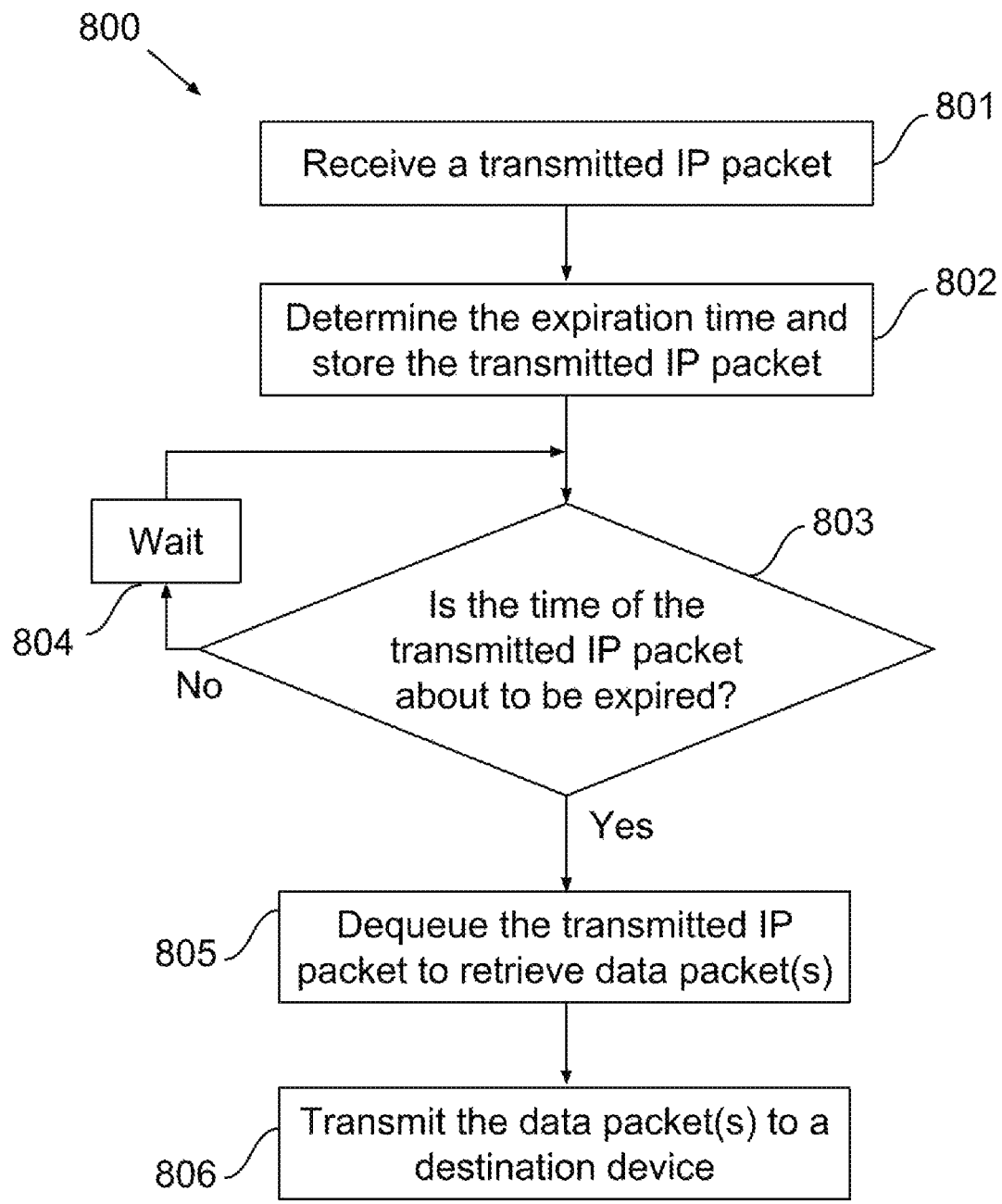
FIG. 8 illustrates a flowchart depicting a method for reducing jitter of a bonded connection in accordance with an embodiment of the present invention.

FIG. 8 illustrates a high level flow diagram of a receiving router depicting a method 800 for reducing jitter when forwarding data packets to a destination device. For illustration purpose, the receiving router is communications router 108 and FIG. 8 is discussed in conjunction with FIG. 6. It should be appreciated that the particular functionality, the order of the functionality, etc. provided in FIG. 8 is intended to be exemplary of operation in accordance with the concepts of the present invention. Accordingly, the concepts herein may be implemented in various ways differing from that of the illustrated embodiment.

The clock at the receiving router should be at least in microsecond precision and in nanosecond precision for network that is not faster than 100 Gbps and for network that is faster than 100 Gbps respectively. The clock may be a BIOS clock of the receiving router or based on BIOS clock. When a transmitted IP packet is received by the receiving router, a processing unit will store the transmitted IP packet in queue along with an expiration time of the transmitted IP packet. The expiration time may be stored in the same queue, in a list, in a table or any non-transitory computer readable storage medium at the receiving router. When the expiration time of an transmitted IP packet is reached, the data packet encapsulated in the transmitted IP packet will then be forwarded to the destination device. For transmitted IP packet 603*b*, it is received by receiving router at time t=3 ms at step 801, and then stored by a processing unit of the receiving router into a queue corresponding to the session identification in step 802. For illustration purpose, transmitted IP packet 603*b* is the first transmitted IP packet received in time sequence 613. The session identification is encapsulated in the information, which is illustrated by the shaded area of the transmitted IP packet 603*b*.

As session sequence number of transmitted IP packet 603*b* is two, processing unit is able to determine that there is a transmitted IP packet with session sequence number one has not arrived yet at time t=31 ms, and as a result, processor of receiving router may not process transmitted IP packet 603*b* and/or will not forward the data packet encapsulated in IP packet 603*b* to the destination device of the data packet. Expiration time of the transmitted IP packet 603*b* may be set to any value at this point. The expiration time, for example, is set to t=44 ms at step 802. Transmitted IP packet 603*b* will wait and be kept stored in the queue at step 804. In one variant, the expiration time is set at 61 ms at step 802 for a longer buffer so as to improve sequence order. In one variant, the expiration time is set at 36 ms at step 802 for a shorter buffer so as to forward the data packet earlier.

By time t=44 ms, the time of the transmitted IP packet 603*b* is or upon being expired in step 803. The transmitted IP packet 603*b* is dequeued at step 805. Then data packet 602*b* is decapsulated from transmitted IP packet 603*b*. Finally, data packet 602*b* is transmitted to the destination device at t=44 ms at step 806.

For transmitted IP packet 603*a*, it encapsulates data packet 602*a*, which was received by sending communication device earlier than data packet 602*b*. When transmitted IP packet 603*a* is received by receiving router at step 801, it is then stored in the queue corresponding to the session identification at step 802. As the session sequence number of transmitted IP packet 603*a* is prior to session sequence number of transmitted IP packet 603*b*, transmitted IP packet 603*a* is placed at a position earlier than the position of transmitted IP packet 603*b* in the queue at step 802. Further, as indicated by the session sequence number, the processing unit of the receiving router is able to determine that data packet 602*a* is the first packet in the session. In another example, no data packet will be forwarded to the destination device until a transmitted IP packet with session sequence number one arrived. This ensures that the first data packet forwarded to the destination device is the data packet with session sequence number one and may reduce jitter.

A buffer period is assigned to transmitted IP packet 603*a*. The buffer period of transmitted IP packet 603*a* is based on a time value configured by an administrator of receiving router or retrieved from a remote management server. The benefits of having a large buffer period including: reducing possibility of forwarding out of sequence data packets to the destination device; and reducing jitter when forwarding data packets to the destination device. The benefits of having a short buffer period including: smaller size queue is required and forwarding data packets earlier.

In one embodiment, the value of buffer period is configurable by a user or an administrator through command line, a web page or a graphical user interface (GUI) of the communication router. The value of buffer period may also be pre-configured by the vendor of the communications router. In one example, same value of buffer period is applied to all transmitted IP packets. In another example, different sessions or flows may have different buffer period values. Therefore, a GUI may allow a user or an administrator to enter buffer period values corresponding to different sessions or flows. For example, buffer period value for a session of source IP address A, source port A, destination IP address B and destination port B may be configured by a user to be 10 ms while buffer period value for a session of source IP address C, source port C, destination IP address D and destination port D may be configured to be 300 ms.

For example, if the buffer period is configured to be 7 ms for the first data packet in a session, the transmitted IP packets encapsulating the first data packet of a session will be stored in the queue for 7 ms and then the first data packet will be forwarded to the destination device. Therefore, transmitted IP packet 603*a* will be stored in the queue for 7 ms. Subsequent data packets of the data session will be forwarded to the destination device after being stored in the queue shorter or longer than 7 ms, depending on the time variation experienced by each transmitted IP packet during transmission.

In one variant, transmitted IP packets that do not encapsulate the first data packet in the session may also be stored in the queue according to a second buffer period, such as at least one half of the buffer period or up to twice of the buffer period. This allows flexibility in determining expiration time of a transmitted IP packet. Alternatively, a user or administrator of the receiving router may input the range of buffer period to the receiving router.

In one variant, transmitted IP packets that do not encapsulate the first data packet in the session will be stored in the queue for the buffer period if the queue is empty.

By reference to the expiration time of the transmitted IP packets encapsulating the first data packet, the expiration time of the other transmitted IP packets encapsulating the subsequent data packets could be calculated. Further, storage time of each transmitted IP packets may also be determined by subtracting its expiration time from the time it arrived the receiving router. Storage time of a transmitted IP packet may change according to the upcoming received transmitted IP packet. In general, a transmitted IP packet having an earlier session sequence number should have an earlier expiration time in the queue. If a transmitted IP packet having an earlier session sequence number arrives late, it is possible that adjustment on the storage time of the currently stored transmitted IP packet may be required. It should be noted when storage time of a currently stored transmitted IP packet is adjusted, expiration time of the currently stored transmitted IP packet is also adjusted. In such case, the storage time of the currently stored transmitted IP packet may be prolonged. If a transmitted IP packet having a later session sequence number arrives early, adjustment on the storage time of the currently stored transmitted IP packet may be required, and the storage time of the currently stored transmitted IP packet may be shortened.

As the expiration time of the transmitted IP packets 603a is t=41 ms, refer to time sequence 611, the time difference between data packets 602a and 602b at the sending router is 3 ms (4 ms−1 ms). Therefore, as shown in time sequence 614, the expiration time of the transmitted IP packets 603b is t=44 ms (41 ms+3 ms). Further, the storage time of the transmitted IP packets 603b is calculated to be 13 ms (44 ms−31 ms).

For transmitted IP packet 603c, refer to time sequence 611, the time difference between data packets 602a and 602c at the sending router is 6 ms (7 ms−1 ms). Therefore, as shown in time sequence 614, the expiration time of the transmitted IP packets 603c at the receiving router is t=47 ms (41 ms+6 ms). Further, the storage time of the transmitted IP packets 603c is calculated to be 11 ms (47 ms−36 ms).

As the transmitted IP packets may arrive the receiving router in random order, some of the transmitted IP packets with prior sequence number may arrive late. In one variant, if the calculated expiration time of a newly received transmitted IP packet is already expired. Therefore, the data packet encapsulated in the transmitted IP packet should be decapsulated and forwarded to the destination device without further delay. In this case, storage time of the newly received transmitted IP packet should be zero, or the newly received transmitted IP packet will not be stored in the queue. Other transmitted IP packets received but not yet dequeued will remain in the queue, the expiration time of other currently stored transmitted IP packet may remain the same. In one variant, if the calculated expiration time of a newly received transmitted IP packet is already expired. The newly received transmitted IP packet will still be stored in the queue but dequeued immediately. In one variant, if the calculated expiration time of a newly received transmitted IP packet is already expired, expiration time of the currently stored transmitted IP packets will be adjusted. A new expiration time is calculated for currently stored transmitted IP packets so as to restore the sequence; and to reduce jitter by keeping the time difference of expiration time among the transmitted IP packets close to the time difference of the time value in field 711 among the transmitted IP packets.

There is no limitation that when determining expiration time, arrival time of data packets at the sending router must be used. In one example, the transmission time of transmitted IP packet at the sending router may be used. For instance, refer to time sequence 612, the time difference between transmitted IP packets 603a and 603c at the sending router is 6 ms (17 ms−11 ms). The expiration time for transmitted IP packet 603c is calculated to be 47 ms (41 ms+6 ms). A processing unit of the receiving router may use the time value in field 711 of the information of the transmitted IP packet as one of a plurality of parameters to determine the expiration time.

At step 803, the processing unit of the receiving router will determine whether the expiration time of the transmitted IP packets is already expired. When the expiration time of a transmitted IP packet is or upon being expired, step 805 will then be performed to dequeue the transmitted IP packet and decapsulate the transmitted IP packet to retrieve the data packet(s) encapsulated. At step 806, the data packet(s) will then be transmitted to the destination device. Using transmitted IP packet 603b as an example, data packet 602b will be transmitted to the destination device at step 806 when its corresponding expiration time is or upon being expired and after steps 803 and 805 are performed.

Figure 9:
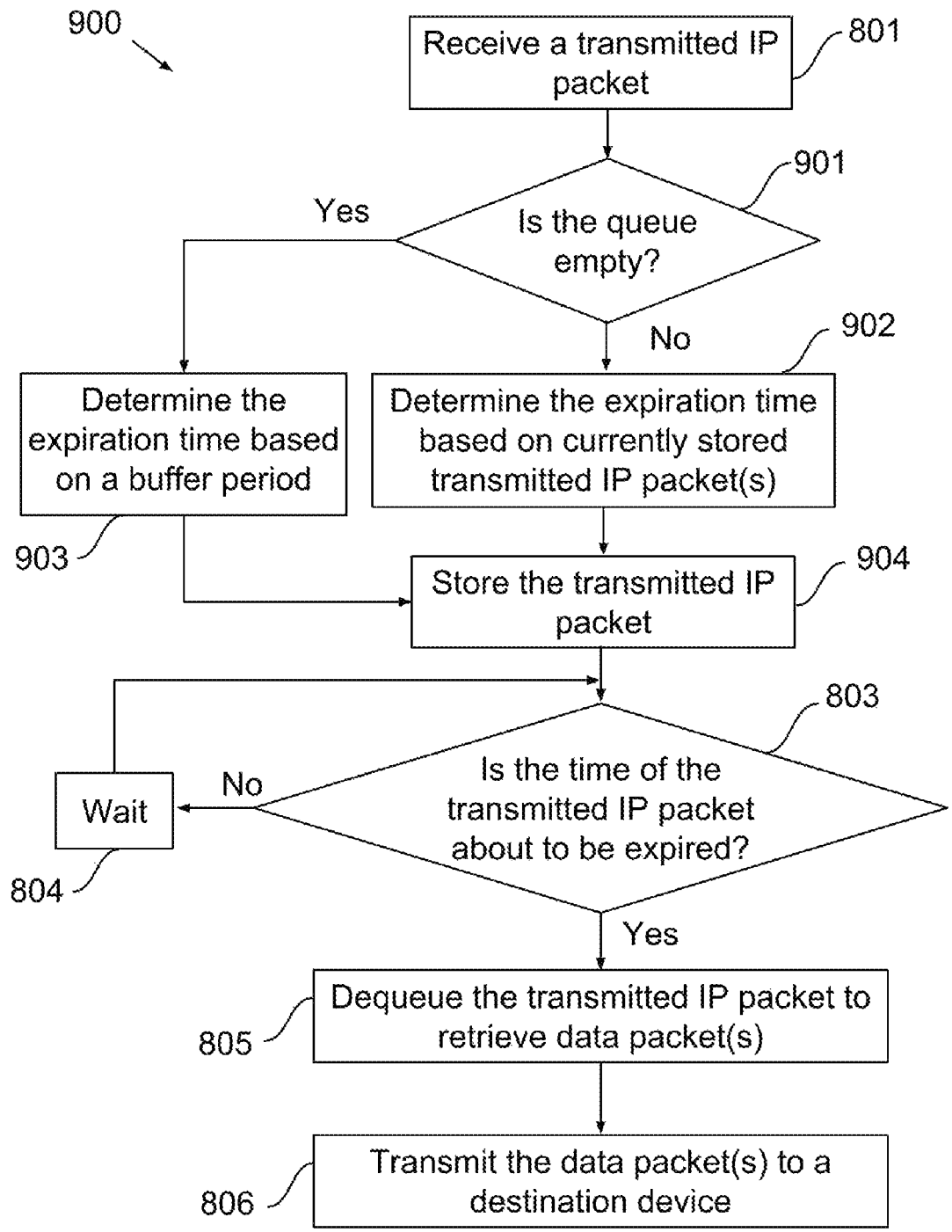
FIG. 9 illustrates a flowchart depicting a method for reducing jitter of a bonded connection in accordance with an embodiment of the present invention.

FIG. 9 illustrates a high level flow diagram of a receiving router depicting a method 900 for reducing jitter when forwarding data packets to a destination device. In this embodiment, based on method 800, step 802 is replaced by steps 901-904.

In the circumstances that a long delay is experienced, for a period of time, during transmission of transmitted IP packets of a session. As a result, it is possible that all the priorly arrived transmitted IP packets of a session had already been dequeued, decapsulated and forwarded to the destination device, resulting an empty queue within the same session. When the queue is empty, there is no currently stored transmitted IP packet. When transmitted IP packets of the same session arrive at the receiving router, its calculated expiration time maybe already expired, therefore, the transmitted IP packets will be decapsulated and forwarded to the destination device immediately so as to avoid further delay. However, the sequence correctness and the time differences among the remaining packets are neglected. Method 900 provides an extra procedure to reduce the jitter caused under this situation.

In step 901, after receiving a transmitted IP packet, the processing unit of the receiving router 108 will determine the status of the queue in step 901. If the queue is not empty, step 902 will be performed accordingly. The expiration time is determined based on time differences between the time value in field 711 of the transmitted IP packet and the time value in field 711 of one or more currently stored transmitted IP packets. If the queue is empty, there is no currently stored transmitted IP packet, there is no reference to determine the expiration time. Therefore, a buffer period is used to determine the expiration time of the transmitted IP packet in step 903. In one variant, the expiration time and session sequence number of the last transmitted IP packet dequeued are recorded and used for reference to determine the expiration time.

The buffer period may be predefined by the manufacturer of receiving router 108, or may be set by a user or an administrator through command line, a web page or a GUI of the communication router. In one variant, the expiration time is the arrival time of the transmitted IP packet at the receiving router plus the buffer period. In step 904, the transmitted IP packet is stored in the queue for dequeuing.

Figure 10:
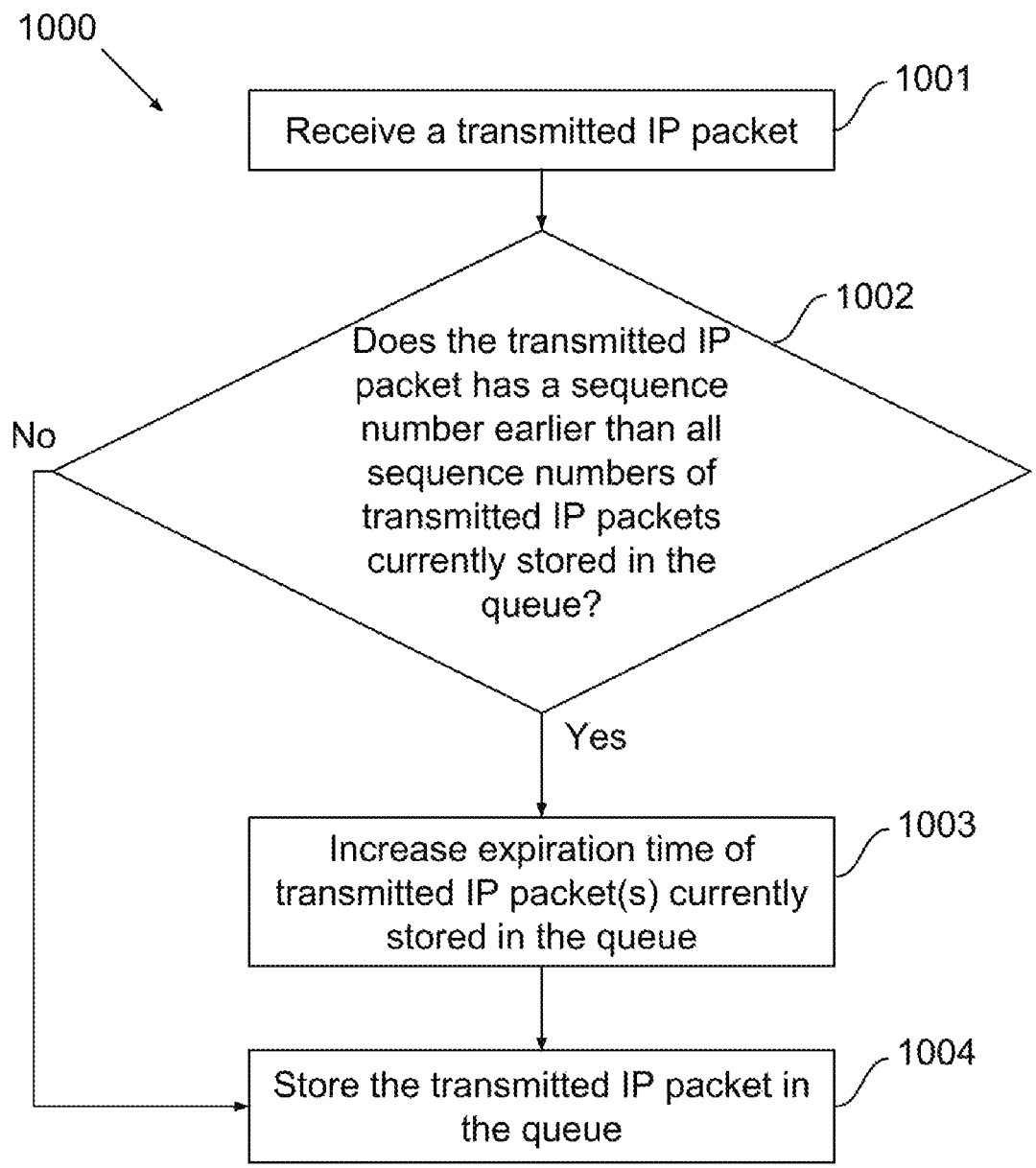
FIG. 10 illustrates a flowchart depicting a method for reducing jitter of a bonded connection in accordance with an embodiment of the present invention.

FIG. 10 illustrates a high level flow diagram of a receiving router depicting a method 1000 for reducing jitter when forwarding data packets to a destination device. At step 1001, a receiving router, such as communication router 108, receives a transmitted IP packet. At step 1002, a processing unit will determine whether the transmitted IP packet has a sequence number earlier than all sequence numbers of transmitted IP packets currently stored in the queue.

If the transmitted IP packet has an earliest sequence number, it is likely that the transmitted IP packet arrived late. In order to reduce jitter, expiration time of transmitted IP packets currently stored in the queue will be increased to reflect the delay caused by the transmitted IP packet at step 1003. Therefore, the forwarding of data packets encapsulated in transmitted IP packets currently stored will be delayed.

If the transmitted IP packet does not have an earliest sequence number, the transmitted IP packet may arrive early or may arrive late (but not too late to affect jitter). Therefore step 1003 can be skipped.

At step 1004, the transmitted IP packet is stored in the queue corresponding to the session identification stored in session identification field 712. In one variant, if transmitted IP packet is already expired, step 1004 is skipped and the data packet encapsulated in the transmitted IP packet will then be forwarded.

Figure 11:
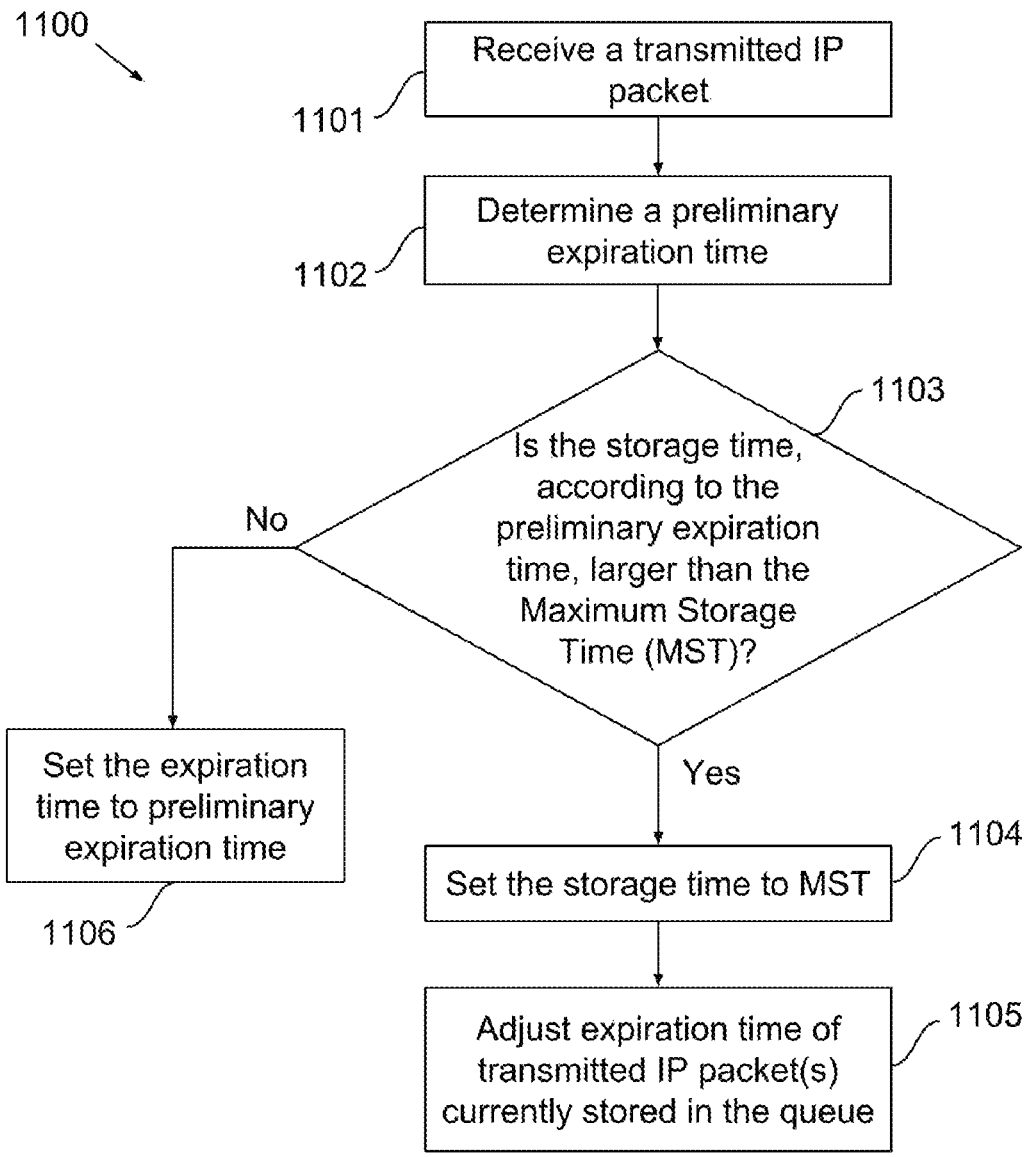
FIG. 11 illustrates a flowchart depicting a method for reducing jitter of a bonded connection in accordance with an embodiment of the present invention.

FIG. 11 illustrates a high level flow diagram of a receiving router depicting a method 1100 for reducing jitter when forwarding data packets to a destination device. FIG. 11 is discussed in conjunction with FIG. 6. In this embodiment, each transmitted IP packet received by the receiving router is only allowed to be stored in the queue for a maximum storage time (MST). There are two stages to determine the expiration time for each transmitted IP packets.

At step 1101, the receiving router, such as communications router 108, received a transmitted IP packet through a plurality of connections from a sending router, such as communications router 106. According to the session identification, the processing unit is able to identity the session and its corresponding queue. At step 1102, a processing unit will perform the first stage, which is to calculate preliminary expiration time of the transmitted IP packet received.

The preliminary expiration time is calculated based on the time difference with one or more currently stored transmitted IP packets in the queue. For example, for illustration purpose, expiration time for transmitted IP packet 603a is 41 ms. As the time difference between data packets 602d and 602a is 7 ms, the preliminary expiration time of transmitted IP packet 602d is then set to t=48 ms (41 ms+7 ms).

At step 1103, the processing unit will determine whether the preliminary storage time is larger than the MST. If time is now at 40 ms and the MST is configured to be 10 ms, then transmitted IP packet 603d will be stored in the queue for 8 ms (48 ms−40 ms), which is less than the MST (8 ms<10 ms). Therefore, step 1106 is performed, the storage time of transmitted IP packet 603d is set to the value of the preliminary storage time, which is 8 ms. Therefore, the transmitted IP packet 603d will be stored in the queue until t=48 ms (40 ms+8 ms). Accordingly, when expiration time of the transmitted IP packet is or upon being expired, the transmitted IP packet will be dequeued from the queue and be decapsulated to retrieve the data packet encapsulated in the payload of the transmitted IP packet, and then the data packet will be forwarded to the destination device.

At step 1103, if the storage time according to the preliminary expiration time is larger than the MST, the processing unit will perform the second stage which is illustrated by steps 1104 and 1105.

At step 1104, the expiration time of the transmitted IP packet received is set to the MST. For example, for illustration purpose, expiration time for transmitted IP packet 603a is 41 ms. As the time difference between data packets 602c and 602a is 6 ms, the preliminary expiration time of transmitted IP packet 603c is then set to t=47 ms (41 ms+6 ms). If the time is now at 36 ms and the MST is configured to be 5 ms, then transmitted IP packet 603c will be stored in the queue for 11 ms (47 ms-36 ms), which is larger than the MST (11 ms>5 ms). Therefore, the storage time of transmitted IP packet 603c is set to the value of the MST, which is 5 ms. Transmitted IP packet 603c is stored in the queue until t=41 ms (36 ms+5 ms).

At step 1105, expiration times of transmitted IP packets currently stored in the queue will be adjusted in order to reduce jitter. This also ensures that no transmitted IP packet received will be stored in the queue longer than the MST.

After adjustment at step 1105, if the expiration time of a currently stored transmitted IP packet becomes expired, that transmitted IP packet will be decapsulated immediately. The corresponding data packet will be forwarded to destination device accordingly.

In one variant, if there is no transmitted IP packet in the queue, the preliminary storage time of the transmitted IP packet is set to the MST or a value substantially close to the MST.

Figure 12:
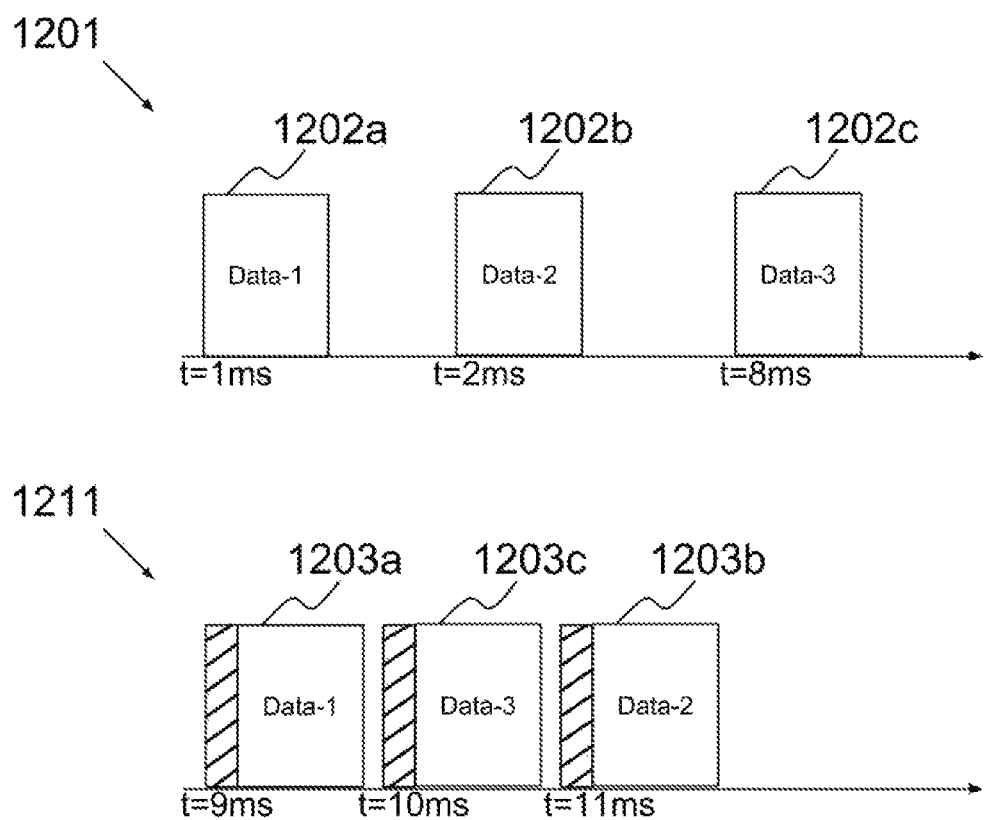
FIG. 12 illustrates time sequences of data packets and embedded IP packets in accordance with an embodiment of the present invention.

In another example illustrated by FIG. 12 viewing in conjunction with the high level flow diagram illustrated in FIG. 11, communications router 106 received data packets 1202a-1202c in time sequence 1201 at time t=1 ms, t=2 ms, and t=8 ms respectively from a sending device. Transmitted IP packets 1203a-1203c encapsulate data packets 1202a-1202c respectively and arrived at communication router 108 in time sequence 1211 at t=9 ms, t=11 ms and t=10 ms respectively.

For illustration purpose, the MST is configured to be 16 ms. The storage time for the first arrived transmitted IP packet of a session is set to be the MST. When transmitted IP packet 1203a arrived at t=9 ms, it will be stored in the queue for 16 ms and therefore, data packet 1202a is scheduled to be forwarded to the destination device at t=25 ms (9 ms+16 ms). When transmitted IP packet 1203c arrived at t=10 ms, as the time difference between data packet 1202c and 1202a is 7 ms, then at step 1102, the preliminary expiration time is set to t=32 ms (25 ms+7 ms). The storage time is based on the preliminary expiration time, therefore, will be 22 ms (32 ms−10 ms). As the storage time is larger than the MST (22 ms>16 ms) in step 1103, the storage time is set to the MST at step 1104. As a result, expiration time for transmitted IP packet 1203c is then set to be t=26 ms (10 ms+16 ms). Expiration time of transmitted IP packet 1203a, which is currently stored, will then be adjusted to t=19 ms (26 ms−7 ms) at step 1105.

When transmitted IP packet 1203b arrives at t=11 ms, the preliminary expiration time will be calculated to be t=20 ms as the expiration time of transmitted IP packet 1203a is adjusted to t=19 ms and data packet 1202b is received by communication router 106 1 ms after data packet 1202a and 6 ms before data packet 1202c. The storage time based on the preliminary expiration time will then be 9 ms and less than the MST at step 1103. The expiration time will then be set to t=20 ms at step 1106.

In one variant, the MST is still configured to be 16 ms but the storage time for the first arrived transmitted IP packet of a session is only one half of the MST. For readability, the preliminary percentage of the MST for the first arrived IP packet to be stored is referred as PPMST. PPMST, in this variant, is set to 50%. When transmitted IP packet 1203a arrived at t=9 ms, it will be stored in the queue for 8 ms (16 ms×50%) and therefore, data packet 1202a is scheduled to be forwarded to the destination device at t=17 ms (9 ms+8 ms). When transmitted IP packet 1203c arrived at t=10 ms, the preliminary expiration time is set to t=24 ms (17 ms+7 ms). The storage time according to the preliminary expiration time, therefore, will be 14 ms (24 ms-10 ms). As the storage time is smaller than the MST in step 1103, the expiration time is then set to the same value of the preliminary expiration time, which is t=24 ms, at step 1106.

When transmitted IP packet 1203b arrives at t=11 ms, the preliminary expiration time will be calculated to be t=18 ms (17 ms+1 ms) as the expiration time of transmitted IP packet 1203a is t=17 ms and data packet 1202b is received by communication router 106 1 ms after data packet 1202a and 6 ms before data packet 1202c. The storage time based on the preliminary expiration time will then be 6 ms and less than the MST at step 1103. The expiration time will then be set to t=18 ms at step 1106.

There is no limit on the value of MST. There is also no limit on the PPMST as long as it is not more than one hundred percent. As illustrated in the last illustration, when the first arrived transmitted IP packet of a session is set to a value less than the MST, it reduces the probability of adjusting the expiration time for currently stored transmitted IP packets. One of the observed benefits is to reduce the effect on jitter for transmitted IP packets that arrive much earlier than other transmitted IP packets.

In one embodiment, the value of the MST is configurable by a user or an administrator through command line, a web page or a graphical user interface of the communication router. The value of the MST may also be retrieved from a remote server or pre-configured by the vendor of the communications router. In one example, one MST is applied for all transmitted IP packets. In another example, different sessions or flows may have different MST values. Therefore, a GUI may allow a user or an administrator to enter the MST values corresponding to different sessions or flows. For example, the MST value for a session of source IP address A, source port A, destination IP address B and destination port B may be configured by a user to be 10 ms while the MST value for a session of source IP address C, source port C, destination IP address D and destination port D may be configured by a user or an administrator to be 300 ms.

There is no limitation that there is only one MST for the receiving router. In one variant, one MST is applicable to all connections that are bonded between the transmitted router and receiving router. Therefore, all connections or tunnels in a bonded site-to-site VPN connections on multi WAN routers have the same MST. In one variant, there is one MST for each connection of a bonded connection. In one variant, there is one MST for each session of each connection of a bonded connection.

In one embodiment, the value of the PPMST is also configurable by a user or an administrator through command line, a web page or a GUI of the communication router. The value of the PPMST may also be retrieved from a remote server or pre-configured by the vendor of the communications router. In one example, one MST is applied for all transmitted IP packets. In another example, different sessions or flows may have different PPMST values. Therefore, a GUI may allow a user or an administrator to enter the PPMST values corresponding to different sessions or flows. For example, the PPMST value for a first session is 10% while the PPMST value for a second session is 80%.

There is no limitation that there is only one PPMST for the receiving router. In one variant, one PPMST is applicable to all connections that are bonded between the transmitted router and receiving router. In one variant, each connection of a bonded connection has its own PPMST. In one variant, each session has its own PPMST. In one variant, each session and each connection of a bonded connection has its own PPMST.

In one variant, when there is no transmitted IP packets in the queue, the expiration time of the transmitted IP packet is set to the MST or a value substantially close to one half of the MST. This may help reducing jitter in the scenario when the next transmitted IP packet arrived late and/or a future transmitted IP packet arrive much earlier than other transmitted IP packets.

There is no limitation that embodiments of present inventions are limited to Internet Protocol packets. These embodiments are also applicable to other non-circuit-switching communication protocols, including Ethernet.

Figure 5:
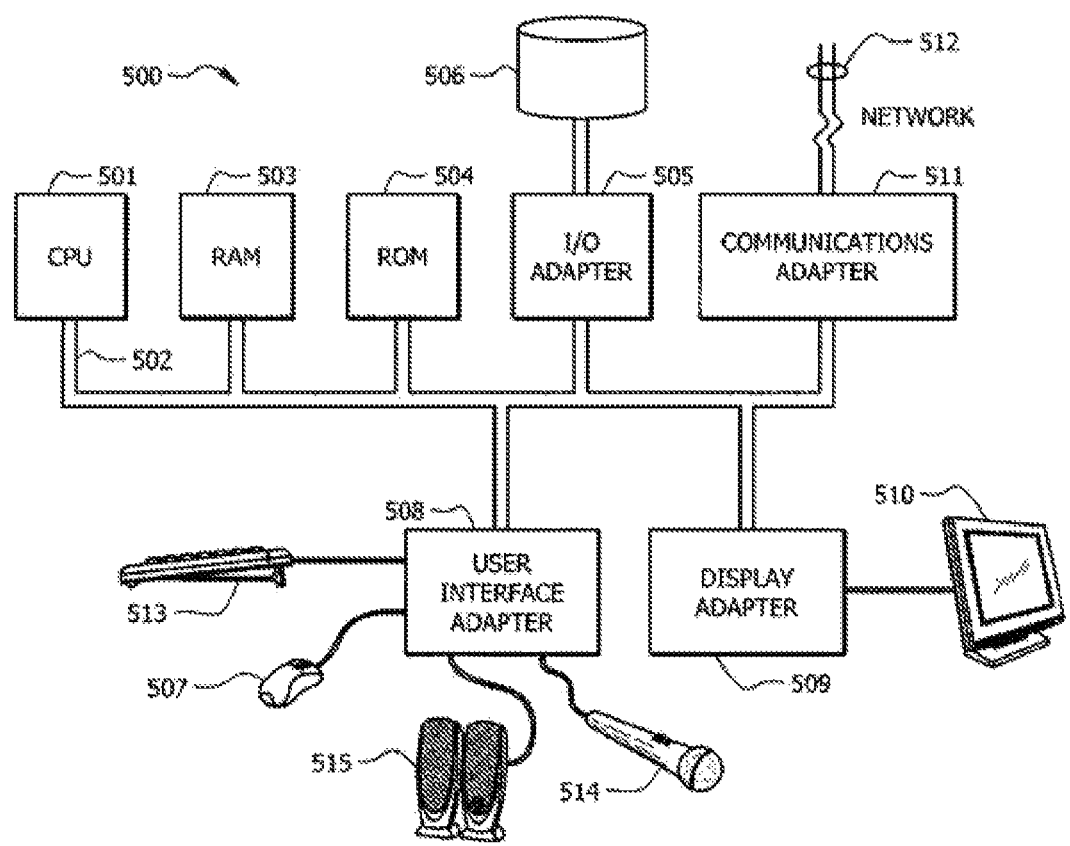
FIG. 5, a prior art, depicts a block diagram of a processing system which is adapted to implement the present invention.

FIG. 5 illustrates an exemplary processor-based system 500 which may be employed to implement the systems, devices, and methods according to certain embodiments. Central processing unit (CPU) 501 is coupled to system bus 502. CPU 501 may be any general purpose CPU, or may be a special purpose CPU designed to implement the above teachings. The present disclosure is not restricted by the architecture of CPU 501 (or other components of exemplary system 500) as long as CPU 501 (and other components of system 500) supports the inventive operations as described herein. CPU 501 may execute the various logical instructions described herein. For example, CPU 501 may execute machine-level instructions. When executing instructions, CPU 501 becomes a special-purpose processor of a special purpose computing platform configured specifically to operate according to the various embodiments of the teachings described herein.

System 500 also includes random access memory (RAM) 503, which may be SRAM, DRAM, SDRAM, or the like. System 500 includes read-only memory (ROM) 504 which may be PROM, EPROM, EEPROM, or the like. RAM 503 and ROM 504 hold user and system data and programs, as are well known in the art.

System 500 also includes input/output (I/O) adapter 505, communications adapter 511, user interface adapter 508, and display adapter 509. I/O adapter 505, user interface adapter 508, and/or communications adapter 511 may, in certain embodiments, enable a user to interact with system 500 in order to input information.

I/O adapter 505 connects storage device(s) 506, such as one or more of hard drive, compact disc (CD) drive, floppy disk drive, tape drive, etc., to system 500. The storage devices are utilized in addition to RAM 503 for the memory requirements associated performing the operations discussed in the above embodiments. Communications adapter 511 is adapted to couple system 500 to network 512, which may enable information to be input to and/or output from system 500 via such network 512 (e.g., the Internet or other wide-area network, a local-area network, a public or private switched telephony network, a wireless network, any combination of the foregoing). User interface adapter 508 couples user input devices, such as keyboard 513, pointing device 507, and microphone 514 and/or output devices, such as speaker(s) 515 to system 500. Display adapter 509 is driven by CPU 501 to control the display on display device 510. Display adapter 509 transmits instructions for transforming or manipulating the state of the various numbers of pixels used by display device 510 to visually present the desired information to a user. Such instructions include instructions for changing state from on to off, setting a particular color, intensity, duration, or the like. Each such instruction makes up the rendering instructions that control how and what is displayed on display device 510. User interface adapter 508 and display adapter 509 are optional. For example, a router may not need user interface adapter 508 and display adapter 509 as the router can be configured remotely through network 512.

It shall be appreciated that the present disclosure is not limited to the architecture of system 500. For example, any suitable processor-based device may be utilized for implementing the above teachings, including without limitation routers, personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although embodiments of the present invention and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method to transmit and receive data packets between a first network node and a second network node through a plurality of connections, wherein the plurality of connections are bonded to form a bonded connection, comprising:
   a. at the first network node, encapsulating a data packet, a session identification of the data packet, a session sequence number of the data packet, and a time value of the data packet in an encapsulating packet;
   b. at the first network node, sending the encapsulating packet to the second network node through the bonded connection;
   c. at the second network node, after receiving the encapsulating packet, storing the encapsulating packet in a queue;
   d. at the second network node, determining whether the queue is empty; and
   determining an expiration time of the encapsulating packet; and
   e. at the second network node, when the expiration time of the encapsulating packet expires:
      i. dequeuing the encapsulating packet; and
      ii. forwarding the data packet according to a destination of the data packet;
   wherein:
      the queue is selected based on the session identification of the data packet;
      when the queue is empty, the expiration time of the encapsulating packet is determined based on a buffer period; and
      when the queue is not empty, the expiration time of the encapsulating packet is based on time differences of a time value of the encapsulating packet and a time value of at least one currently-stored encapsulating packet;
      the session identification of the data packet identifies a session of the data packet; and
      the session sequence number of the data packet enables the data packet to be re-ordered per session.

2. The method of claim 1, further comprising, at the second network node, determining whether the expiration time of the encapsulating packet is expired before the encapsulating packet is received; and
   wherein the expiration time of the encapsulating packet is determined based on the time value.

3. The method of claim 2, further comprising, at the second network node, when the expiration time of the encapsulating packet is expired, forwarding the data packet; and when the expiration time of the encapsulating packet is not expired, storing the encapsulating packet in the queue; and
   wherein:
      the expiration time of the encapsulating packet sent in step (b) is determined further based on an expiration time of at least one earlier-received encapsulating packet received by the second network node earlier; and
      the at least one earlier-received encapsulating packet received by the second network node earlier and the encapsulating packet sent in step (b) have a same session identification.

4. The method of claim 3, further comprising, at the second network node, adjusting the expiration time of the at least one earlier-received encapsulating packet received by the second network node earlier.

5. The method of claim 1, wherein the time value is determined based on one of (i) a time the data packets arrived at the first network node, and (ii) the time value is determined based on a time the data packets are to be sent by the first network node or upon being sent by the first network node.

6. The method of claim 1, wherein the time value is recorded in microsecond precision or nanosecond precision.

7. The method of claim 1, wherein at least two of the plurality of connections have different latencies.

8. The method of claim 1, further comprising, at the first network node, encapsulating a global sequence number in the encapsulating packet.

9. The method of claim 1, further comprising, at the second network node, increasing the expiration time of the encapsulating packet.

10. A system for transmitting and receiving data packets through a plurality of connections established between a first network node and a second network node, comprising:
    the first network node; and
    the second network node, wherein the first network node is coupled to the second network node via the plurality of connections;
    wherein:
       the plurality of connections are bonded to form a bonded connection;
       the first network node comprises:
          at least one first network interface;
          at least one first processing unit;
          at least one first main memory; and
          at least one first secondary storage storing program instructions executable by the at least one first processing unit and configured to cause the at least one first processing unit to perform:
             a. encapsulating a data packet, a session identification of the data packet, a session sequence number of the data packet, and a time value of the data packet in an encapsulating packet; and
             b. sending the encapsulating packet to the second network node through the bonded connection; and
       the second network node comprises:
          at least one second network interface;
          at least one second processing unit;
          at least one second main memory;
          at least one second secondary storage storing program instructions executable by the at least one second processing unit and configured to cause the at least one second processing unit to perform:

c. after receiving the encapsulating packet, storing the encapsulating packet in a queue;
d. determining whether the queue is empty; and determining an expiration time of the encapsulating packet; and
e. when the expiration time of the encapsulating packet expires:
   i. dequeuing the encapsulating packet; and
   ii. forwarding the data packet according to a destination of the data packet;

wherein:
the queue is selected based on the session identification of the data packet;
when the queue is empty, the expiration time of the encapsulating packet is determined based on a buffer period; and
when the queue is not empty, the expiration time of the encapsulating packet is based on time differences of a time value of the encapsulating packet and a time value of at least one currently-stored encapsulating packet;
the session identification of the data packet identifies a session of the data packet; and
the session sequence number of the data packet enables the data packet to be re-ordered per session.

11. The system of claim 10, wherein the at least one second secondary storage unit further stores program instructions executable by the at least one second processing unit and configured to cause the at least one second processing unit to perform determining whether the expiration time of the encapsulating packet is expired before the encapsulating packet is received; and
wherein the expiration time of the encapsulating packet is determined based on the time value.

12. The system of claim 11, wherein the at least one second secondary storage unit further stores program instructions executable by the at least one second processing unit and configured to cause the at least one second processing unit to perform when the expiration time of the encapsulating packet is expired, forwarding the data packet; and when the expiration time of the encapsulating packet is not expired, storing the encapsulating packet in the queue; and wherein:
the expiration time of the encapsulating packet sent in step (b) is determined further based on an expiration time of at least one earlier-received encapsulating packet received by the second network node earlier; and
the at least one earlier-received encapsulating packet received by the second network node earlier and the encapsulating packet sent in step (b) have a same session identification.

13. The system of claim 12, wherein the at least one second secondary storage unit further stores program instructions executable by the at least one second processing unit and configured to cause the at least one second processing unit to perform adjusting the expiration time of the at least one earlier-received encapsulating packet received by the second network node earlier.

14. The system of claim 10, wherein the time value is determined based on one of (i) a time the data packets arrived at the first network node, and (ii) the time value is determined based on a time the data packets are to be sent by the first network node or upon being sent by the first network node.

15. The system of claim 10, wherein the time value is recorded in microsecond precision or nanosecond precision.

16. The system of claim 10, wherein at least two of the plurality of connections have different latencies.

17. The system of claim 10, wherein the at least one first secondary storage unit further stores program instructions executable by the at least one first processing unit and configured to cause the at least one first processing unit to perform encapsulating a global sequence number in the encapsulating packet.

18. The system of claim 10, wherein the at least one second secondary storage further stores program instructions executable by the at least one second processing unit and configured to cause the at least one second processing unit to perform increasing the expiration time of the encapsulating packet.

* * * * *